United States Patent [19]
Troy et al.

[11] Patent Number: 6,130,290
[45] Date of Patent: Oct. 10, 2000

[54] IMPACT MODIFIER FOR AMORPHOUS AROMATIC POLYESTER

[75] Inventors: Edward Joseph Troy, Bristol; Joseph John Ryan, Yardley, both of Pa.

[73] Assignee: Rohm and Haas Company, Philadelphia, Pa.

[21] Appl. No.: 09/277,002

[22] Filed: Mar. 26, 1999

Related U.S. Application Data

[60] Provisional application No. 60/083,432, Apr. 29, 1998.

[51] Int. Cl.⁷ .......................... C08G 63/48; C08G 63/91; C08L 51/08; C08L 51/00; C08L 53/00
[52] U.S. Cl. .................. 525/63; 525/64; 525/67; 525/71; 525/902
[58] Field of Search .............................. 525/71, 902, 64, 525/67, 63

[56] References Cited

U.S. PATENT DOCUMENTS

| | | |
|---|---|---|
| 3,793,402 | 2/1974 | Owens . |
| 3,971,835 | 7/1976 | Myers et al. . |
| 4,034,013 | 7/1977 | Lane . |
| 4,707,513 | 11/1987 | Baer . |
| 4,713,268 | 12/1987 | Carson . |
| 5,321,056 | 6/1994 | Carson et al. . |
| 5,322,663 | 6/1994 | Lai et al. . |
| 5,438,099 | 8/1995 | Fischer et al. . |
| 5,534,594 | 7/1996 | Troy et al. . |
| 5,560,994 | 10/1996 | Kitaike et al. . |
| 5,563,227 | 10/1996 | Kitaike et al. . |
| 5,576,394 | 11/1996 | Chao et al. . |
| 5,599,854 | 2/1997 | Troy et al. . |
| 5,652,306 | 7/1997 | Meyer et al. . |
| 5,668,215 | 9/1997 | Chao et al. . |

FOREIGN PATENT DOCUMENTS

| | | |
|---|---|---|
| 597275 B1 | 10/1993 | European Pat. Off. . |
| 93/21274 | 10/1993 | WIPO . |

OTHER PUBLICATIONS

JP 54–48850 (English Translation), Apr. 1979.

*Primary Examiner*—Patrick D. Niland
*Attorney, Agent, or Firm*—Jeffrey H. Rosedale

[57] ABSTRACT

Impact modifiers that produce transparent, high Dynatup impact strength blends with amorphous, aromatic polyesters are described. The impact modifiers are core-shell polymers with (A) a core composed principally of rubbery polymers, such as copolymers of diolefins with vinyl aromatic monomers, such as copolymers of butadiene with styrene, (B) an intermediate stage composed principally of hard polymers, such as polymers or copolymers of vinyl aromatic monomers, and (C) a shell composed principally of vinyl aromatic copolymers that contain hydroxyl functional groups or their equivalents (e.g. styrene/hydroxyalkyl (meth)acrylate copolymers).

7 Claims, No Drawings

IMPACT MODIFIER FOR AMORPHOUS AROMATIC POLYESTER

This application claims benefit of Provisional Application Ser. No. 60/083,432 filed Apr. 29, 1998.

BACKGROUND

The present invention relates to an impact modifier composition which provides an improved balance of impact resistance and optical clarity to amorphous aromatic polyester resin (hereafter referred to as polyester). More specifically, the present invention concerns an impact modifier composition which contains a rubbery core, an intermediate hard stage, and a shell containing a hydroxyl group or another functional group which acts in a similar manner as the hydroxyl group.

Polyesters (e.g., polyethylene terephthalate, polybutylene terephthalate, etc.) exhibit various excellent properties such as resistance to temperature, chemicals, weathering, radiation and burning and also exhibit excellent clarity (in amorphous form), reasonable cost, as well as moldability. Accordingly, polyesters are used for various purposes (e.g., fibers, films, molded and extruded products, etc.). The impact resistance of the polyester, however, is less than satisfactory. Plastics such as poly (butylene terephthalate) (PBT) and poly(ethylene terephthalate) (PET) have insufficient impact strength, and many attempts have been made to improve the impact strength. Many agents have been proposed to improve the impact strength. These are added to resins and subjected to melt-blending.

Various attempts have been made using conventional fibrous inorganic fillers (e.g., glass fiber, asbestos fiber, etc.) to improve the impact resistance of polyester. Even when these methods are implemented, however, the impact resistance improvement is less than satisfactory and clarity in amorphous polyesters is adversely affected.

Various techniques wherein rubbery polymers or rubber-containing polymers are mixed with polyesters have been developed to improve the impact resistance of polyesters and thermoplastic materials. Specifically, certain core-shell polymers comprising a core made of rubbery polymer and a shell, around the core, made of a glassy polymer are excellent agents for improvement of impact strength of polyesters where clarity is not an object.

When these prior art methods are used, the polyester resin generally exhibits poor compatibility with the shell of the rubber-containing polymer, and therefore impact resistance is not fully optimized. Even when these prior art core-shell modifiers are added to amorphous polyesters and found to produce ductile, notched breaks, the clarity of amorphous polyester resins is destroyed. An amorphous polyester may contain a small amount of crystallinity, but the level must be low enough so that clarity is not adversely affected. Further, although the polyester may be crystallized under certain conditions, in the present invention the molding and cooling conditions are such that crystallization (and loss of clarity) is avoided.

Lane, U.S. Pat. No. 4,034,013 teaches core/shell polymers functionalized with an epoxy group, such as a shell of methyl methacrylate/glycidyl methacrylate, to improve the melt strength of polyesters. Although Lane broadly teaches butadiene-based elastomers with optional minor amounts of styrene in the core and teaches styrene as a major component of the outer stage, she does not teach or suggest a solution to preparing an efficient impact modifier which will retain clarity in the amorphous polyester.

Kishimoto et al., Japanese Kokai 54-48850, disclose butadiene-based core/shell polymers with hydroxyalkyl groups in the shell portion as modifiers for crystalline polyesters, such as poly(butylene terephthalate), but do not teach the means to modify such core/shell polymers to make them useful as impact modifiers in clear, amorphous polyesters.

Carson et al., U.S. Pat. No. 5,321,056 teaches impact modifiers which produce transparent, high notched Izod impact strength blends with amorphous aromatic polyesters. Carson's impact modifiers are core-shell polymers with cores comprised mainly of rubbery polymers of diolefins and vinyl aromatic monomers and shells comprised mainly of vinyl aromatic monomers and monomers containing a hydroxyl group. Although Carson provides for significantly improved impact strength of clear, amorphous aromatic polyester, a need still exists for a modifier that can provide an improved balance of properties between impact strength and optical clarity. Specifically, a need exists to reduce or eliminate the blue/yellow hue or tint that often results from blending such modifiers in amorphous aromatic polyester resins.

The object of the present invention is to provide a composition for improving the impact strength of polyesters, such as PET or PET copolyesters, when they are processed into clear, tough objects while retaining their amorphous nature. It is another objective that said composition provide improved impact properties without reducing the transparency of amorphous polyesters. A further objective is that the composition provide reduced blue/yellow hue, while maintaining desirable impact and transparency characteristics. Another object is to provide a composition which will also overcome the embrittlement caused by physical aging which commonly occurs in amorphous aromatic polyesters when conditioned at temperatures approaching glass transition temperature (Tg). A still further object is to provide clear amorphous extrusion/melt shaped or injection molded PET or PET copolyester articles.

STATEMENT OF INVENTION

In the present invention, impact strength of amorphous aromatic polyesters is increased substantially by the addition of small amounts of certain core-shell modifiers which disperse very readily in aromatic polyesters and do not detract from clarity. Additionally, the present invention provides an improved balance of impact resistance and optical properties over previously known compositions. Specifically, the present invention provides impact modifiers that substantially reduce the blue/yellow hue of impact-modified clear amorphous aromatic polyesters. These and other objects as will become apparent from the following disclosure are achieved by the present invention.

The impact modifier composition of this invention is a core-shell polymer with (A) a rubbery core such as a copolymer containing a diolefin, preferably a 1,3-diene, (B) an intermediate stage comprised mainly of a hard polymer such as a polymer containing a vinyl aromatic monomer, and (C) a shell comprised mainly of a vinyl aromatic monomer (such as styrene), and hydroxyalkyl (meth)acrylate or, in the alternative, another functional monomer which acts in a manner similar to the hydroxyalkyl (meth)acrylate).

The impact modifier of the present invention comprises:
(A) from about 15 to about 85 parts of a core stage comprising from about 40 to about 60 percent by weight of units derived from a vinyl aromatic monomer, from about 20 to about 60 percent by weight of units derived from at least one 1,3-diene, up to about 10 percent by weight of units derived from at least one copolymerizable vinyl or vinylidene monomer, and up to about 5 percent by weight of at least one graft-linking or cross-linking monomer;

(B) from about 10 to about 50 parts of an intermediate stage comprising at least about 25 percent by weight of units derived from a vinyl aromatic monomer; and (C) from about 5 to about 35 parts of an outer shell comprising from about 2 to about 40 percent by weight of units derived from at least one hydroxyalkyl (meth) acrylate, from about 60 to about 98 percent by weight of units derived from at least one vinyl aromatic monomer, and up to about 25 percent by weight in the shell of units derived from one or more copolymerizable vinyl or vinylidene monomer, and up to about 5 percent by weight of units derived from at least one graft-linking or cross-linking monomer.

A further variation of the impact modifier structure is to provide within the core (A): (1) an inner hard stage and, (2) an outer rubbery stage. The inner hard stage comprises at least 80 percent of units derived form at least one vinyl aromatic monomer, up to about 20 percent of units derived from at least one other copolymerizable vinyl or vinylidene monomer, up to about 20 percent by weight of units derived from at least one 1,3-diene, and up to about 5 percent by weight of units derived from at least one graft-linking or cross-linking monomer.

The outer rubbery stage comprises up to about 60 percent by weight of units derived from a vinyl aromatic monomer, at least about 30 percent by weight of units derived from at least one 1,3-diene, up to about 10 percent by weight of units derived from at least one compolymerizable vinyl or vinylidene monomer, and up to about 5 percent by weight of units derived from at least one graft-linking or cross-linking monomer.

As used throughout this document, the term "stage" is intended to encompass its broadest possible meaning, including the meaning conveyed in prior art such as U.S. Pat. No. 3,793,402, U.S. Pat. No. 3,971,835, U.S. Pat. No. 5,534,594, and U.S. Pat. No. 5,599,854, which offer various means for achieving "staged" polymers.

Another aspect of the invention is the blending of the impact modifier composition with at least one aromatic polyester and/or copolyester at a weight ratio of about 99/1 to about 70/30 of polyester/impact modifier, the polyester remaining amorphous. A still further aspect of the invention comprises molded parts, bottles, sheet, films, pipes, foams, containers, profiles, or other articles prepared in accordance with the above-mentioned compositions and blends.

DETAILED DESCRIPTION OF THE INVENTION

It has been found that certain core-shell impact modifiers produce clear, and unexpectedly tough blends with amorphous aromatic polyesters. These modifiers produce a large increase in impact strength, while maintaining excellent optical clarity of the polyesters. These modifiers have (A) a core composed principally of rubbery polymers, such as copolymers of diolefins with vinyl aromatic monomers, such as copolymers of butadiene with styrene, (B) an intermediate stage composed principally of hard polymers, such as polymers or copolymers of vinyl aromatic monomers, and (C) a shell composed principally of vinyl aromatic copolymers that contain hydroxyl functional groups or their equivalents (e.g. styrene/hydroxyalkyl (meth)acrylate copolymers). For example, the core-shell impact modifiers (i.e. "modifiers") which give this unexpected result contain shells derived from copolymers of vinyl aromatic monomers with certain hydroxyalkyl (meth)acrylates, for example, hydroxyethyl (meth)acrylate (HEMA), hydroxypropyl (meth)acrylate (HPMA), 4-hydroxybutyl acrylate, ethyl alpha-hydroxymethylacrylate, or hydroxyethyl acrylate (HEA), or other copolymerizable monomers containing one or more hydroxyl groups, such as allyl cellosolve, allyl carbinol, methylvinyl carbinol, allyl alcohol, methallyl alcohol, and the like. Also included are other monomers which function in a similar manner, for example, glycidyl methacrylate (GMA), 3,4-epoxybutyl acrylate, acrylonitrile, methacrylonitrile, beta-cyanoethyl methacrylate, beta-cyanoethyl acrylate, cyanoalkoxyalkyl (meth)acrylates, such as omega-cyanoethoxyethyl acrylate, or omega-cyanoethoxyethyl methacrylate, (meth)acrylamides, such as methacrylamide or acrylamide, N-monoalkyl (meth) acrylamides, such as N-methylacrylamide or N-t-butylacrylamide or N-ethyl (meth)acrylamide, or vinyl monomers containing an aromatic ring and an hydroxyl group, preferably non-phenolic, such as vinylphenol, para-vinylbenzyl alcohol, meta-vinylphenethyl alcohol, and the like. Styrene homopolymer and other styrene copolymers and terpolymers, such as styrene/methyl methacrylate are very much less effective.

The monomer concentrations in the core, intermediate stage and shell of the modifier composition are adjusted to provide a refractive index (RI) to match that of the polyesters with which they are blended (i.e. about 1.55 to about 1.60). This produces a clear blend under processing conditions which will maintain the polyester in its amorphous form. Almost all rubbery polymers (e.g. cores) have RI's well below this range. Therefore it is necessary that the rubber phase concentration of the impact modifier composition be kept relatively low and the other components of the modifier be used to bring the RI into the desired range. However, the impact strength obtainable with a given concentration of any core-shell impact modifier tends to vary directly with the amount of rubber polymer in the modifier. This means that high RI modifiers having low rubber contents have to be exceptionally efficient to produce good toughening.

From a practical standpoint the most desirable monomer to produce rubbery polymer for this application is butadiene whose homopolymer has a RI=1.52. It has the best combination of RI, cost, stability, and processability. For the same reasons, styrene is the most desirable component for the rest of the modifier. However, even if butadiene and styrene were the only components of the modifier, a butadiene/styrene ratio ranging from about 50/50 to 20/80 would be required for the modifier RI to be in the 1.55 to 1.60 range needed for matching the RI's of amorphous, aromatic polyesters. One skilled in the art of impact modification would expect a 50% concentration of butadiene to be very low for good core-shell impact modifier efficiency. The results found herein for modification of polyesters with such functionalized "rubber-poor" modifiers are surprisingly good.

In response to the need to match RI's of amorphous aromatic polyesters and simultaneously have excellent impact modifier efficiency, U.S. Pat. No. 5,321,056 reports that when low concentrations of certain hydroxyalkyl (meth) acrylates are copolymerized with aromatic vinyl monomers to form the shell of core-shell impact modifiers having RI's in the 1.55 to 1.58 range, very high notched Izod impact strengths are obtained with amorphous polyesters at 30% or lower modifier loadings, and preferably at from about 5 to about 20% loadings. Substitution of the hydroxyalkyl methacrylate with other functional monomers promoting compatibility of the shell with the polyester will give similar results in impact improvement and maintenance of clarity. The modifier composition of the present invention provides improved optical properties over the polymers reported in U.S. Pat. No. 5,321,056, while maintaining the reported excellent impact modifier efficiency of the compositions.

The requirement for a "rubber-poor" modifier can be relaxed somewhat if the vinyl aromatic monomer is changed from styrene, vinyl toluene, para-methylstyrene, monochlorostyrene and the like to one of high refractive index, viz., the polybrominated vinyl aromatics or the polycyclic vinyl aromatics.

The core of the impact modifier composition of the present invention is a rubbery polymer and generally comprises a copolymer of butadiene and a vinyl aromatic monomer. The rubbery polymer may include diene rubber copolymers (e.g., butadiene-styrene copolymer, butadiene-styrene-(meth)acrylate terpolymers, butadiene-styrene-acrylonitrile terpolymers, isoprene-styrene copolymers, etc.). Of the afore-mentioned rubbery polymers, those which can be produced as a latex are especially desirable. In particular, a butadiene-vinyl aromatic copolymer latex obtained as a result of emulsion polymerization is preferred. In the core, a partially crosslinked polymer can also be employed if crosslinking is moderate. Further, at least one of a cross- or graft-linking monomer, otherwise described as a multi-functional unsaturated monomer, can also be employed. Such monomers include divinylbenzene, diallyl maleate, butylene glycol diacrylate, allyl methacrylate, and the like.

The ratio of comonomers in the core depends on the desired core-shell ratio and hardness of the rubber phase. The ratio range of butadiene to the vinyl aromatic in the core polymer is 70/30 to 20/80 (parts by weight). If the quantity of butadiene is below 20 parts by weight, it is difficult to improve the impact resistance. If the quantity of butadiene exceeds 70 parts by weight, on the other hand, it is difficult to obtain a high enough RI modifier to match that of the polyester, unless the vinyl aromatic monomer is of high refractive index and selected from the polybrominated or polycyclic monomers described above. Optionally, a small concentration, from about 0.01 up to about 5, and preferably from about 0.1 up to about 2 percent, by weight of a crosslinking monomer, such as divinyl benzene or butylene glycol dimethacrylate is included, and optionally about 0.01 to about 5 percent by weight of a graftlinking monomer for tying the core and shell together, such as allyl maleate may be included in the rubbery core polymer. Further examples of crosslinking monomers include alkanepolyol polyacrylates or polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, and unsaturated carboxylic acid allyl esters such as allyl acrylate, allyl methacrylate or diallyl maleate.

As the intermediate stage of the impact modifier composition, hard polymers or copolymers of vinyl aromatic monomers are preferred. Generally, polymers or copolymers with a Tg above room temperature can be used. Examples of suitable vinyl aromatic monomers include vinyl aromatic monomers such as styrene, alpha-methyl styrene, para-methyl styrene, chlorostyrene, vinyl toluene, dibromostyrene, tribromostyrene, vinyl naphthalene, isopropenyl naphthalene, divinyl benzene and the like.

As the shell of the impact modifier composition, a hydroxyl-group-containing monomer is preferred to be employed. When a hydroxyl group is introduced to the shell polymer, a vinyl monomer containing an active double-bond segment and a hydroxyl group (hereafter referred to as hydroxyl-group-containing monomer) is copolymerized with another copolymerizable vinyl monomer. Examples of the aforementioned hydroxyl-group-containing monomers include hydroxyalkyl (meth)acrylate or alpha-hydroxymethylacrylate esters, such as hydroxyethyl (meth) acrylate, hydroxypropyl (meth)acrylate, or ethyl hydroxymethylacrylate, allyl derivatives of hydroxyl-group containing compounds, such as allyl cellosolve, allyl carbinol, methylvinyl carbinol, allyl alcohol, methallyl alcohol, and the like, vinylphenol, para-vinylbenzyl alcohol, meta-vinylphenethyl alcohol, and the like.

Although the hydroxyalkyl (meth)acrylate monomers are preferred for reasons of safety in handling (over the nitrile-containing monomers) or availability (over other monomers taught herein), other monomers which function in a similar manner may be employed, for example, glycidyl methacrylate (GMA), 3,4-epoxybutyl acrylate, acrylonitrile, methacrylonitrile, beta-cyanoethyl methacrylate, beta-cyanoethyl acrylate, cyanoalkoxyalkyl (meth)acrylates, such as omega-cyanoethoxyethyl acrylate, or omega-cyanoethoxyethyl methacrylate, (meth)acrylamide, or N-monoalkyl (meth)acrylamide and the like.

Vinyl aromatic monomers to be copolymerized with the aforementioned hydroxyl-group-containing monomers include vinyl aromatic monomers such as styrene, alpha-methyl styrene, para-methyl styrene, chlorostyrene, vinyl toluene, dibromostyrene, tribromostyrene, vinyl naphthalene, isopropenyl naphthalene, and the like. The hydroxyl-group-containing monomers and vinyl aromatic monomers may be used either singly or in combination of two or more.

In the shell, the ratio between the hydroxyl- group-containing monomer (e.g. HEMA, HPMA) or a monomer which performs in a similar manner (e.g. MAN, AN, or GMA), and the other copolymerizable vinyl monomers (e.g. styrene, tribromostyrene) ranges from 2/98 to 40/60 parts by weight, and preferably 3/97 to 30/70 parts by weight. Below 2 parts, the performance is not improved over the vinyl aromatic homopolymer shell, and above that level, side reactions, such as crosslinking, may occur, with adverse effects on dispersion.

Optionally, one or more additional monomers may be added to the shell to adjust the RI. This additional monomer is preferably an alkyl (meth)acrylate (such as $C_1$–$C_4$ alkyl (meth) acrylate, and the like), but it can be any monomer which copolymerizes with the other two monomers used in the core polymer and produces a terpolymer which permits the RI of the modifier to match that of the polyesters with which it is blended.

The additional monomer may include one or more of any of the following monomers: acrylonitrile, methacrylonitrile, methyl acrylate, ethyl acrylate, propyl acrylate, butyl acrylate, 2-ethylhexyl acrylate, decyl acrylate, methyl methacrylate, ethyl methacrylate, divinyl benzene and the like.

The resultant composition preferably has a particle size range of about 75 to about 300 nm, more preferably from about 140 nm to about 230 nm, and a RI range of about 1.55 to about 1.60.

When the impact modifier composition containing 15–85 parts by weight of the aforementioned rubbery core, 10–50 parts by weight of the intermediate stage, and 5–35 parts by weight of the shell hydroxyl-group-containing polymer (total: 100 parts by weight) is manufactured, conventional methods for manufacturing ordinary rubber-modified polymers (e.g., ABS resin, impact resistant polystyrene, etc.) may be effectively employed. These impact modifiers may be prepared by emulsion polymerization. The preferred procedure is emulsion polymerization using soaps, initiators and processing conditions normally used for making MBS polymers, that is, impact modifiers based on butadiene-styrene rubbers with one or more stages of styrene or methyl methacrylate polymers. Isolation from the emulsion can be achieved by standard procedures such as spray drying or coagulation. For example, a polymer latex characterized by an appropriate particle size and degree of conversion is produced by means of emulsion polymerization (e.g. copolymerizing a hydroxyl-group-containing monomer with another copolymerizable vinyl monomer in the presence of a polymerized rubber latex upon which a vinyl aromatic monomer has been polymerized or copolymerized to form an intermediate hard stage).

Further, the polymer can be prepared by a method wherein a core is uniformly graft-polymerized with an intermediate hard stage comprising at least one vinyl aromatic monomer, which is uniformly graft-polymerized with a hydroxyl-group-containing monomer and another copolymerizable vinyl monomer constituting the shell polymer.

Thus, when the impact modifier composition is manufactured, general free radical polymerization techniques (e.g., emulsion polymerization, solution polymerization, and suspension polymerization) may be employed so long as the resulting impact modifier composition is characterized by a core-shell structure wherein hydroxyl groups are preserved.

The impact modifier composition may be isolated from the reaction medium by any of several known processes. For example, when prepared in emulsion, the composition may be isolated by coagulation, including coagulation in an extruder from which the water is removed as a liquid, or by spray-drying. Additives such as thermal stabilizers and anti-oxidants may be added to the composition prior to, during or after, isolation.

It is important that no crystallization promoter is present in the composition since this invention is directed to compositions suitable for producing amorphous, non-crystalline articles. If substantial crystallization occurs in the process, the resultant articles become opaque and brittle. In some cases, such as with pipe, foam and profile extrusion, a small degree of crystallinity may be acceptable and can be achieved by control of the cooling cycle. However, in most cases it is preferred to prepare amorphous articles on standard injection molding and extrusion equipment. The type of articles to be produced, whether it be molded parts, bottles, films, foams, pipes, tubing, sheet or profiles, will govern the auxiliary equipment to be employed. For instance, to produce bottles, extrusion blow molding equipment is necessary. To produce film, blown film equipment is necessary.

The amorphous, aromatic polyesters, such as PET, and copolyesters, such as Eastman PETG (i.e., (poly)ethylene-co-1,4-cyclohexanedimethylene terephthalate), of this invention include poly ($C_1$ to $C_6$ alkylene terephthalates), alkylene naphthalene dicarboxylates, such as poly(ethylene naphthalene-2,6-dicarboxylate), and aromatic amorphous polyester which contains units derived from at least one aliphatic diol or cycloaliphatic diol or combinations of aliphatic diols and cycloaliphatic diols and one or more aromatic dibasic acids. Examples include polyethylene terephthalate (PET), polypentylene terephthalate, and the like, or an aromatic copolyester which contains units derived from two glycols (e.g., ethylene glycol, and cyclohexanedimethanol) or from two dibasic acids (e.g. terephthalic acid and isophthalic acid). Such polyesters may be obtained by polycondensing polyol components (e.g., ethylene glycol) with dicarboxylic acid components (e.g., terephthalic acid, isophthalic acid, naphthalenedicarboxylic acid, etc.), as well as mixtures consisting of two or more polyesters.

The modifiers and polyesters may be combined by melt blending in an extruder. The polyesters should be dried to 0.03% moisture content. A mix of the two components can be directly extruded or molded or the components can be combined in an initial blending step and the pellets from this blend can then be molded after drying to a 0.03% moisture content. The concentration of modifier in these polyester blends can range from about 1 to about 30% by weight and preferably from about 5 to about 20% by weight. The blends can be extruded or molded into clear parts which have very high Dynatup impact strength, and exhibit ductile type failures and physical aging resistance. The required modifier concentration will depend on factors such as the molecular weight of the polyester, the impact strength desired, and the temperature at which the final object is utilized. Below 1% modifier concentration, no significant effect is seen.

Blends should contain amorphous aromatic polyester or copolyester which has an intrinsic viscosity of greater than or equal to 0.7 dl/g. for best properties of molding and processing, but for some uses, lower molecular weight polyesters may be employed. (PET or PETG may decrease in intrinsic viscosity after melt processing; the values in the specification refer to the polyester as supplied, prior to processing). Articles such as containers, bottles, foam, or hollow parts may be extrusion blow molded, extruded or injection molded from polyester blends described herein.

Blending can be accomplished by melt extrusion in an extruder at temperatures of about 193° C. to about 288° C., preferably about 204° C. to about 265° C. For example, a high work, two stage screw which has a length/diameter ratio of about 24/1, and a compression ratio of about 3.0 to 3.5 gives a very adequate dispersion of the modifier in the polyester. A dwell time in the extruder of 1 to 5 minutes is adequate to insure complete mixing or dispersion under most conditions but of course lower and higher dwell times can certainly be used. Preferably the strands produced by extruder blending are pelletized and dried to a moisture content of less than 0.03 percent before molding.

The ingredients used to make the composition of the invention are dispersed uniformly and it has been found that melt blending the ingredients, by using such equipment as a melt extruder (e.g., single screw extruders or twin screw extruders) in a separate step prior to molding is desirable. The blended product may be pelletized (i.e., the extruded strand is quenched and cut), dried and used for subsequent molding purposes.

Other additives known in the art may be included in the composition at about 1 to about 30% by weight. These other additives may include antioxidants, flame retardants, reinforcing agents such as glass fiber, asbestos fiber and flake, mineral fillers, stabilizers, nucleating agents, ultraviolet light stabilizers, heat and light stabilizers, lubricants, dyes, pigments, toners, mold release agents, fillers, such as glass beads and talc, and the like. Minor amounts of other polymers (i.e. about 1 to about 10 percent by weight) can also be incorporated in the present composition, such as polyamides or polycarbonates. Most of these additives will adversely affect clarity. The additives listed above such as antioxidants, thermal stabilizers, fillers, pigments and flame retardant additives may be used in the composition of this invention provided they do not exert any adverse effect on the impact strength or clarity. It is preferred not to have glass fiber reinforcement in clear article applications or any additive which would decrease transparency. It is highly preferred that clear articles are produced.

The polyesters must be thoroughly dried prior to melt processing to minimize the rapid hydrolytic degradation known to occur at processing temperatures and to reduce molecular weight. The modifiers of the present invention are much less sensitive to hydrolytic degradation than the polyesters. Higher than necessary melt temperatures should be avoided during processing to keep the impact strength as high as possible. Melt cooling should be carried out as rapidly as possible to prevent polyester crystallization and the loss of clarity.

Aromatic amorphous polyesters are quite sensitive to embrittlement from physical aging, but this limitation is overcome by the modifiers herein (see Table 1). Therefore, polyester blends will now be able to compete successfully with polycarbonate, cellulosics, impact modified polyvinyl chloride, and the like for a broad range of applications where high clarity and toughness are needed in the absence of exceptional heat resistance.

The preferred poly(alkylene terephthalates) are polyethylene terephthalate (PET) and copolyesters of PET. Blends with other polyesters are also suitable. For example, blends of two or more polyesters may also be used, with polyester blends which have poly (ethylene terephthalate) being preferred.

EXAMPLES

The following examples and comparative examples are presented to illustrate the invention, but the invention should not be limited by these examples. All parts and percentages are by weight unless otherwise indicated. The following abbreviations are employed in the examples:

Bd=butadiene
S=styrene
HEMA=hydroxy ethyl methacrylate
DVB=divinyl benzene.

Apparatus and General Procedure

Modifier compositions are melt blended with APET (Shell 8387) using a twin screw extruder. The clear amorphous strands are pelletized and the accumulated product recrystallized before re-extrusion into 0.0762 cm thick sheet. This sheet is then evaluated for impact strength at 23° C. using the Dynatup impact test (ASTM-D3763-93). The test is repeated on sheet test samples that have heat aged at 60° C. over a period of ten days to establish the relative retention of impact strength of the modified APET sheet.

Sheet samples are tested for light transmission and haze according to ASTM-D-1003.

The blue/yellow hue of the sheet samples are measured two ways. First, the "b" value of the Hunter L,a,b scale is measured. The Hunter b value is a measure yellowness-blueness, and the procedure for determining this value is provided in Instruction Manual: HUNTERLAB TRISTIMULUS COLORIMETER MODEL D25P-9 (rev. A). The second parameter measured is referred to as the Scattered Yellowness Index. The Scattered Yellowness Index is calculated according to the Yellowness Index procedure of ASTM-D-1925, using diffused (scattered) Transmission values instead of total Transmission values.

Example 1

A modifier based upon Example 12 of U.S. Pat. No. 5,321,056, with minor modifications, was prepared according to the following procedure:

Charge 34.666 parts deionized water and 0.109 parts acetic acid to a stainless steel reactor capable of withstanding 200 psi (1.38 mPa) pressure. Begin stirring at 100 rpm and heating to 95° C. while sparging with nitrogen for 30 minutes. At 95° C., turn off sparge and add 3.182 parts (33% solids) of a Bd/S (at a ratio of approximately 70:30) seed emulsion. Also add 2.016 parts of a 5% aqueous solution of sodium formaldehyde sulfoxylate, then rinse both with about 2.092 parts deionized water. Evacuate the reactor to 260 mm Hg. At 95° C., begin feeding butadiene [12.824 parts]., a mix of monomers [12.121 parts S and 0.252 parts DVB with a deionized water rinse of 1.356 parts], Dowfax 2A1 soap solution [3.528 parts at 10% solids] to the reactor over a 5 hour period . The 2% aqueous t-butyl hydroperoxide solution [4.143 parts] is added over 7.25 hours. The soap and tBHP solutions are uniform constant rate feeds. The monomer mix and Bd feeds change each hour as follows:

First hour=0.00076 parts/minute S/DVB and 0.00008 parts/minute Bd

Second hour=00055 parts/minute S/DVB and 0.00029 parts/minute Bd

Third hour=00042 parts/minute S/DVB and 0.00042 parts/minute Bd

Fourth hour=00025 parts/minute S/DVB and 0.00059 parts/minute Bd

Fifth hour=00008 parts/minute S/DVB and 0.00076 parts/minute Bd

Continue the 2% aqueous t-butyl hydroperoxide solution feed after the monomer feeds and rinse are done. When all feeds are finished, hold 0.5 hours at 95° C. Cool the reactor to 62° C. and vent to atmospheric pressure.

The shell is prepared by adding 0.657 parts of a 5% solution of sodium formaldehyde sulfoxylate to the reactor [rinse with 0.562 parts deionized water]. At 60° C., begin feeding a mix of S [16.071 parts] and HEMA [2.169 parts] for 1.5 hour at a constant rate. Also begin feeding 1.369 parts of a 2% solution of t-butyl hydroperoxide for 1.5 hour at constant rate. After the 1.5 hour feed is in and rinse [1.264 parts deionized water] is added, chase with 2% solution of t-butyl hydroperoxide solution [1.094 parts] for four hours at constant rate, and 4 shots of a 5% solution of sodium formaldehyde sulfoxylate [0.525 parts total; 0.1313 parts per shot at 0, 1, 2 and 3 hours]. Add 0.575 parts sodium hydroxide solution [0.2% solid] and then add a 50% solids emulsion of Irganox 245 [0.180 parts], tris nonyl phenyl phosphite [0.180 parts] and dilauryl thiodipropionate [0.540 parts]. Cool the batch to 40° C.

The RI of the resulting modifier composition was measured to 1.565±0.002, using ASTM-D-542.

Example 2

A composition within the scope of the present invention was made according to the following procedure:

Charge 23.319 parts deionized water to a stainless steel reactor capable of withstanding 200 psi (1.38 mPa) pressure. Add 1.182 parts of a 5% aqueous solution of sodium formaldehyde sulfoxylate. Begin stirring at 130 rpm and heating to 85° C. while sparging with nitrogen (0.283 scmh) for 30 minutes. At 85° C., turn off sparge and add 3.590 parts (33% solids) of a Bd/S (at a ratio of approximately 70:30) seed emulsion, rinse with about 0.507 parts deionized water. Evacuate the reactor to 362–414 mm Hg. Begin feeding an emulsified mix of monomers, soap and water to the reactor over a 4.75 hour period. The emulsified monomer mix contains: 14.221 parts S, 0.269 parts DVB, 0.213 parts sodium dodecyl benzene sulfonate soap, 6.606 parts deionized water [and 1.014 parts deionized water rinse]. Feed rates for the emulsified monomer mix change over time: 1.75 hours at 0.1349 parts/minute, 1.25 hours at 0.0766 parts/minute and 1.5 hours at 0.0152 parts/minute. Other feeds are started the same time as the emulsified monomer mix: Bd [12.368 parts] is fed over time starting at 1.75 hours after the start of the emulsified monomers [1.25 hours at 0.0522 parts/minute then 1.5 hours at 0.0938 parts/minute]; 2.377 parts of a 10% aqueous solution of sodium dodecyl benzene sulfonate solution is fed at a constant rate of 0.0088 parts/minute for 4.5 hours; 1.774 parts of a 5% aqueous t-butyl hydroperoxide- solution is added at a constant rate of 0.00657 parts/minute for 4.5 hours. At the end of feeds, rinse with 1.267 parts deionized water.

After rinse is added, charge 0.625 parts of a 5% solution of sodium formaldehyde sulfoxylate to the reactor. Begin feeding an emulsified styrene charge for 2 hours at 0.1373 parts/minute [contains: 11.660 parts S, 0.153 parts sodium dodecyl benzene sulfonate, 0.035 parts t-butyl hydroperoxide, 4.628 parts deionized water (and 0.760 parts rinse of deionized water)].

After rinse is added, charge 0.070 parts of 5% solution of t-butyl hydroperoxide and 0.070 parts of 5% solution of sodium formaldehyde sulfoxylate to the reactor. Hold for 1 hour. Vent the reactor to atmospheric pressure.

Begin a constant rate feed of emulsified monomers for 1 hour: 6.142 parts S, 0.840 parts HEMA, 0.014 parts DVB, 0.021 parts t-butyl hydroperoxide, 0.101 parts sodium dodecyl benzene sulfonate, 3.191 parts deionized water (rinse with 0.507 parts deionized water). Feed shots of 5% solution of t-butyl hydroperoxide [1.460 parts] and 5% solution of sodium formaldehyde sulfoxylate [1.016 parts] over 6 hours. A 50% solids emulsion of Irganox 1010 [0.098 parts], Irganox 245 [0.098 parts] and dilauryl thiodipropionate [0.504 parts] is then added. Cool the batch to 60° C.

The RI of the resulting modifier composition was measured to 1.570±0.002, using ASTM-D-542.

Example 3

Charge 21.794 parts deionized water to a stainless steel reactor capable of withstanding 200 psi (1.38 mPa) pressure. Add 1.411 parts of a 5% aqueous solution of sodium formaldehyde sulfoxylate. Begin stirring at 175 rpm and heating to 85° C. while sparging with nitrogen for 30 minutes. At 85° C., turn off sparge and add 3.934 parts (35% solids) of a Bd/S (at a ratio of approximately 70:30) seed emulsion, rinse with about 0.519 parts deionized water. Evacuate the reactor to 362–414 mm Hg. Begin feeding an emulsified mix of monomers, soap and water to the reactor over a 5 hour period. The emulsified monomer mix contains: 23.335 parts S, 0.321 parts DVB, 1.738 parts Dowfax 2A1 soap [20% solid], 9.392 parts deionized water. Feed rates for the emulsified monomer mix change over time: 2 hours at 0.1512 parts/minute, 1.5 hour at 0.0338 parts/minute and 1.5 hours at 0.1512 parts/minute. Other feeds are started as follows: Bd [8.422 parts] is added in a shot plus a feed—at 1 hour after the start of the emulsified monomers a shot of 0.804 parts is added, then a 1.5 hour feed at 0.0846 parts/minute is started at 2 hours after the start of the emulsified monomers; 1.847 parts of a 20% aqueous solution of Dowfax 2A1 soap is fed at a constant rate of 0.00616 parts/minute for 5 hours; 2.117 parts of a 5% aqueous t-butyl hydroperoxide solution is added at a constant rate of 0.00504 parts/minute for 7 hours. At the end of monomer feeds, rinse with 1.038 parts deionized water. Continue feeding 5% aqueous t-butyl hydroperoxide-solution for 2 hours. Hold 30 minutes. Pressure should be about 1.6–1.8×10$^5$ Pa. Vent to atmospheric pressure.

Charge 0.311 parts of a 5% solution of sodium formaldehyde sulfoxylate to the reactor. Begin feeding an emulsified styrene mix for 1 hour at 0.179 parts/minute [contains: 7.161 parts S, 0.527 parts Dowfax 2A1 soap, 3.051 parts deionized water (and 0.519 parts rinse of deionized water)]. Also feed 0.435 of a 5% solution of t-butyl hydroperoxide for one hour at 0.00725 parts/minute.

After 1 hour feed is in and rinse is added, begin a constant rate feed of emulsified monomers for 1 hour [6.287 parts S, 0.859 parts HEMA, 0.015 parts DVB, 0.527 parts Dowfax 2A1 soap [20% solids], 3.051 parts deionized water] (rinse with 0.519 parts deionized water)] and also a 1 hour constant rate feed of 0.435 parts of a 5% solution of t-butyl hydroperoxide solution. After the feeds are in, feed 0.435 parts of 5% solution of t-butyl hydroperoxide solution for one hour at constant rate. A 50% solids emulsion of Irganox 1010 [0.100 parts], Irganox 245 [0.100 parts] and dilauryl thiodipropionate [0.516 parts] is then added. Cool the batch to 60° C.

The RI of the resulting modifier composition was measured to be 1.577±0.002, using ASTM-D-542.

TABLE 1

| Modifier Example No. | Modifier Content (%) | Dynatup Impact Strength (J/m × 10$^2$) Time in Oven at 60° C. (days) | | | | |
|---|---|---|---|---|---|---|
| | | 0 | 1 | 3 | 5 | 10 |
| control | 0 | 246 | 80.1 | 81.1 | 37.9 | 49.1 |
| 1 | 5 | 353 | 280 | 278 | 289 | 323 |
| 2 | 5 | 257 | 251 | 268 | 247 | 258 |
| 3 | 5 | 263 | 185 | 185 | 146 | 116 |
| 1 | 10 | 428 | 307 | 356 | 324 | 381 |
| 2 | 10 | 369 | 288 | 308 | 290 | 289 |
| 3 | 10 | 337 | 282 | 193 | 223 | 168 |

Table 1 reports the measured impact strength of APET blends containing the modifiers of Examples 1 through 3, compared to the impact strength of a control sample (i.e., Shell 8387 APET resin without the addition of modifier). The results illustrate that compositions within the scope of the present invention, such as the modifiers of Examples 2 and 3, provide the excellent impact resistance of compositions reported in U.S. Pat. No. 5,321,056.

TABLE 2

| Modifier Example No. | Modifier Concentration (%) | % Transmission | % Haze | b | Scattered Yellowness Index |
|---|---|---|---|---|---|
| control | 0 | 89.5 | 0.8 | 0.8 | −21 |
| 1 | 5 | 87.2 | 2.6 | 4.6 | −226 |
| 2 | 5 | 88.5 | 2.8 | 3.1 | −197 |
| 3 | 5 | 87.8 | 3 | 1.8 | 2 |
| 1 | 10 | 87.2 | 3.3 | 4.2 | −224 |

TABLE 2-continued

| Modifier Example No. | Modifier Concentration (%) | % Transmission | % Haze | b | Scattered Yellowness Index |
|---|---|---|---|---|---|
| 2 | 10 | 88.9 | 4 | 2.3 | −178 |
| 3 | 10 | 88.2 | 3.6 | 1.6 | −17 |

Table 2 reports the measured optical properties of APET blends containing the modifiers of Examples 1 through 3, compared to the optical properties of the control sample. The results illustrate that compositions within the scope of the present invention, such as the modifiers of Examples 2 and 3, provide dramatically improved optical properties over the compositions reported in U.S. Pat. No. 5,321,056.

We claim:

1. A core-shell impact modifier composition comprising
   (A) from about 15 to about 85 parts of a core comprising from about 40 to about 60 percent by weight of units derived from at least one vinyl aromatic monomer, from about 20 to about 60 percent by weight of units derived from at least one 1,3-diene, up to about 10 percent by weight of units derived from at least one copolymerizable vinyl or vinylidene monomer, and up to about 5 percent by weight of at least one graft-linking or cross-linking monomer;
   (B) from about 10 to about 50 parts of an intermediate stage comprising at least about 25 percent by weight of units derived from at least one vinyl aromatic monomer; and
   (C) from about 5 to about 35 parts of an outer shell comprising from about 2 to about 40 percent by weight of units derived from at least one hydroxyalkyl (meth) acrylate, from about 60 to about 98 percent by weight of units derived from at least one vinyl aromatic monomer, and up to about 25 percent by weight in the shell of units derived from one or more copolymerizable vinyl or vinylidene monomer, and up to about 5 percent by weight of units derived from at least one graft-linking or cross-linking monomer;
the core-shell impact modifier having a refractive index of from about 1.55 to about 1.60.

2. The core-shell impact modifier of claim 1 where the core (A) comprises
   (1) from about 10 to about 50 parts based upon the impact modifier of an inner stage comprising at least 80 percent of units derived form at least one vinyl aromatic monomer, up to about 20 percent of units derived from at least one other copolymerizable vinyl or vinylidene monomer, up to about 20 percent by weight of units derived from at least one 1,3-diene, and up to about 5 percent by weight of units derived from at least one graft-linking or cross-linking monomer; and
   (2) from about 5 to about 75 parts based upon the impact modifier of an outer stage comprising up to about 60 percent by weight of units derived from a vinyl aromatic monomer, at least about 30 percent by weight of units derived from at least one 1,3-diene, up to about 10 percent by weight of units derived from at least one copolymerizable vinyl or vinylidene monomer, and up to about 5 percent by weight of units derived from at least one graft-linking or cross-linking monomer.

3. The core-shell impact modifier of claim 1 where the outer shell (C) comprises a plurality of stages.

4. The core-shell impact modifier of claim 1, 2 or 3 where the vinyl aromatic monomer is selected from styrene, para-methyl styrene, alpha-methyl styrene, chlorostyrene, vinyl toluene, bromostyrene, dibromostyrene, tribromostyrene, iso-propenyl napthalene, or vinyl naphthalene, and where the 1,3-diene is butadiene.

5. The core-shell impact modifier of claim 1, 2 or 3 where the hydroxyalkyl (meth)acrylate is selected from hydroxyethyl (meth)acrylate or hydroxypropyl (meth)acrylate.

6. A clear amorphous blend comprising:
   (A) at least one amorphous aromatic polyester or copolyester having a refractive index of from about 1.55 to about 1.60; and
   (B) the composition of claim 1, 2 or 3;
at a weight ratio of about 99/1 to about 70/30.

7. Articles produced from the blend of claim 6 under conditions that maintain the polyester in an amorphous condition.

* * * * *